(12) United States Patent
Ego

(10) Patent No.: US 9,325,975 B2
(45) Date of Patent: Apr. 26, 2016

(54) IMAGE DISPLAY APPARATUS, PARALLAX ADJUSTMENT DISPLAY METHOD THEREOF, AND IMAGE CAPTURING APPARATUS

(71) Applicant: FUJIFILM Corporation, Tokyo (JP)

(72) Inventor: Shunta Ego, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 84 days.

(21) Appl. No.: 14/228,665

(22) Filed: Mar. 28, 2014

(65) Prior Publication Data

US 2014/0210953 A1     Jul. 31, 2014

Related U.S. Application Data

(63) Continuation of application No. PCT/JP2012/066254, filed on Jun. 26, 2012.

(30) Foreign Application Priority Data

Sep. 30, 2011   (JP) ................................ 2011-218535

(51) Int. Cl.
*H04N 13/04*       (2006.01)
*G03B 15/00*       (2006.01)
(Continued)

(52) U.S. Cl.
CPC ............ *H04N 13/0402* (2013.01); *G03B 15/00* (2013.01); *G03B 17/18* (2013.01);
(Continued)

(58) Field of Classification Search
CPC . H04N 13/0022; G06F 3/04815; G03B 35/08
See application file for complete search history.

(56) References Cited

U.S. PATENT DOCUMENTS

| 5,726,704 A | 3/1998 | Uomori |
| 2004/0233275 A1 | 11/2004 | Tomita |

(Continued)

FOREIGN PATENT DOCUMENTS

| JP | 7-167633 A | 7/1995 |
| JP | 2001-320733 A | 11/2001 |

(Continued)

OTHER PUBLICATIONS

International Search Report issued in PCT/JP2012/066254, mailed on Sep. 25, 2012.

(Continued)

*Primary Examiner* — Joseph Ustaris
*Assistant Examiner* — Zhubing Ren
(74) *Attorney, Agent, or Firm* — Birch, Stewart, Kolasch & Birch, LLP

(57) ABSTRACT

An image display apparatus, includes: a stereoscopic image obtaining unit which obtains a plurality of images having different points of view; a display unit which displays the plurality of images; a photographic subject selecting unit which selects a specific photographic subject in any one of the plurality of images; and a display controller which displays a line where a parallax amount of a first viewpoint image and a second viewpoint image among the plurality of images is zero and an anteroposterior relationship of the line where the parallax amount is zero and a position of the specific photographic subject in an optical axis direction in photographing a stereoscopic image in a partial display region of the display unit as a pseudo overhead view of the photographic subject which is seen from an upper side with respect to the optical axis in photographing the stereoscopic image.

7 Claims, 12 Drawing Sheets

(51) Int. Cl.
*G03B 17/18* (2006.01)
*H04N 5/232* (2006.01)
*H04N 13/02* (2006.01)
*G03B 35/10* (2006.01)

(52) U.S. Cl.
CPC .......... *G03B 35/10* (2013.01); *H04N 5/23212* (2013.01); *H04N 5/23219* (2013.01); *H04N 5/23293* (2013.01); *H04N 5/23296* (2013.01); *H04N 13/0203* (2013.01); *H04N 13/0239* (2013.01); *H04N 13/0296* (2013.01)

(56) References Cited

U.S. PATENT DOCUMENTS

| | | |
|---|---|---|
| 2004/0240056 A1 | 12/2004 | Tomisawa et al. |
| 2005/0089212 A1 | 4/2005 | Mashitani et al. |
| 2006/0072175 A1 | 4/2006 | Oshino |
| 2010/0328432 A1 | 12/2010 | Tanaka |
| 2011/0001802 A1* | 1/2011 | Misawa .......................... 348/51 |
| 2011/0074928 A1 | 3/2011 | Misawa |
| 2012/0162384 A1* | 6/2012 | Vesely et al. .................... 348/47 |

FOREIGN PATENT DOCUMENTS

| | | |
|---|---|---|
| JP | 2004-007396 A | 1/2004 |
| JP | 2004-363680 A | 12/2004 |
| JP | 2006-107213 A | 4/2006 |
| JP | 2010-177741 A | 8/2010 |
| JP | 2011-010128 A | 1/2011 |
| JP | 2011-013993 A | 1/2011 |
| JP | 2011-015721 A | 1/2011 |
| JP | 2011-077900 A | 4/2011 |
| WO | WO 2004/084560 A1 | 9/2004 |

OTHER PUBLICATIONS

Written Opinion issued in PCT/JP2012/066254; mailed on Sep. 25, 2012.

* cited by examiner

IMAGE DISPLAY APPARATUS, PARALLAX ADJUSTMENT DISPLAY METHOD THEREOF, AND IMAGE CAPTURING APPARATUS

CROSS REFERENCE TO RELATED APPLICATION

This is a continuation of International Application No. PCT/JP2012/066254 filed on Jun. 26, 2012, and claims priority from Japanese Patent Application No. 2011-218535, filed on Sep. 30, 2011, the entire disclosures of which are incorporated herein by reference.

BACKGROUND

1. Technical Field

The present invention relates to an image display apparatus, a parallax adjustment display method thereof, and an image capturing apparatus, and particularly, to an image display apparatus which has an excellent usability for a user, a parallax adjustment display method thereof, and an image capturing apparatus.

2. Related Art

In a stereoscopic camera such as a stereo camera which captures a stereoscopic image, a two dimensional image for a right eye and a two dimensional image for a left eye of the same photographic subject which is simultaneously watched by a right eye and a left eye, that is, two two-dimensional images having different points of view (having a parallax) are captured to alternately display both images on a display unit of a rear surface of the camera for every frame to display a stereoscopic image of the photographic subject. The stereoscopic image is also displayed by two captured images having a parallax which are output as through-images from an image capturing element before a user presses a shutter button.

When a camera user presses the shutter button to photograph a stereoscopic image of a photographic subject, the user adjusts the parallax while watching the stereoscopic image of the through image which is displayed on a display unit of the rear surface of a camera to photograph a stereoscopic image having a desired stereoscopic effect. However, it is difficult to adjust the parallax so that a manufacturer of the camera has a problem about how to handle a user interface.

In a stereoscopic image display system disclosed in Patent Literature 1 (JP-A-2004-7396), displaying of a stereoscopic image is disclosed but a user interface which adjusts a parallax is not disclosed. In a stereoscopic image display system disclosed in Patent Literature 2 (JP-A-2001-320733), a technology which adjusts a parallax is disclosed but a user interface which is easily used in a photographing field and through which it is easily understood how the parallax adjustment affects the photographed image is not disclosed.

SUMMARY OF INVENTION

An illustrative aspect of the present invention is to provide an image display apparatus which includes a user interface which allows a user of a camera to intuitively, easily, and precisely adjust a parallax in an image capturing site, a parallax adjustment display method thereof, and an image capturing apparatus.

According to an aspect of the present invention, an image display apparatus and a parallax adjustment display method of the image display apparatus which includes a stereoscopic image obtaining unit which obtains a plurality of images having different points of view; a display unit which displays the plurality of images obtained by the stereoscopic image obtaining unit; and a photographic subject selecting unit which selects a specific photographic subject in any one of the plurality of images, the method includes: displaying a line where a parallax amount of a first viewpoint image and a second viewpoint image among the plurality of images is zero and an anteroposterior relationship of the line where the parallax amount is zero and a position of the specific photographic subject in an optical axis direction in photographing a stereoscopic image in a partial display region of the display unit as a pseudo overhead view of the photographic subject which is seen from an upper side with respect to the optical axis in photographing the stereoscopic image.

With this configuration, a line whose parallax amount is zero and a position of a specific photographic subject are understood from a pseudo overhead view, and a degree of parallax adjustment is understood from an anteroposterior relationship with the line having a zero-parallax amount.

DESCRIPTION OF EMBODIMENTS

Hereinafter, an embodiment of the present invention will be described with reference to the drawings.

Figure 1:
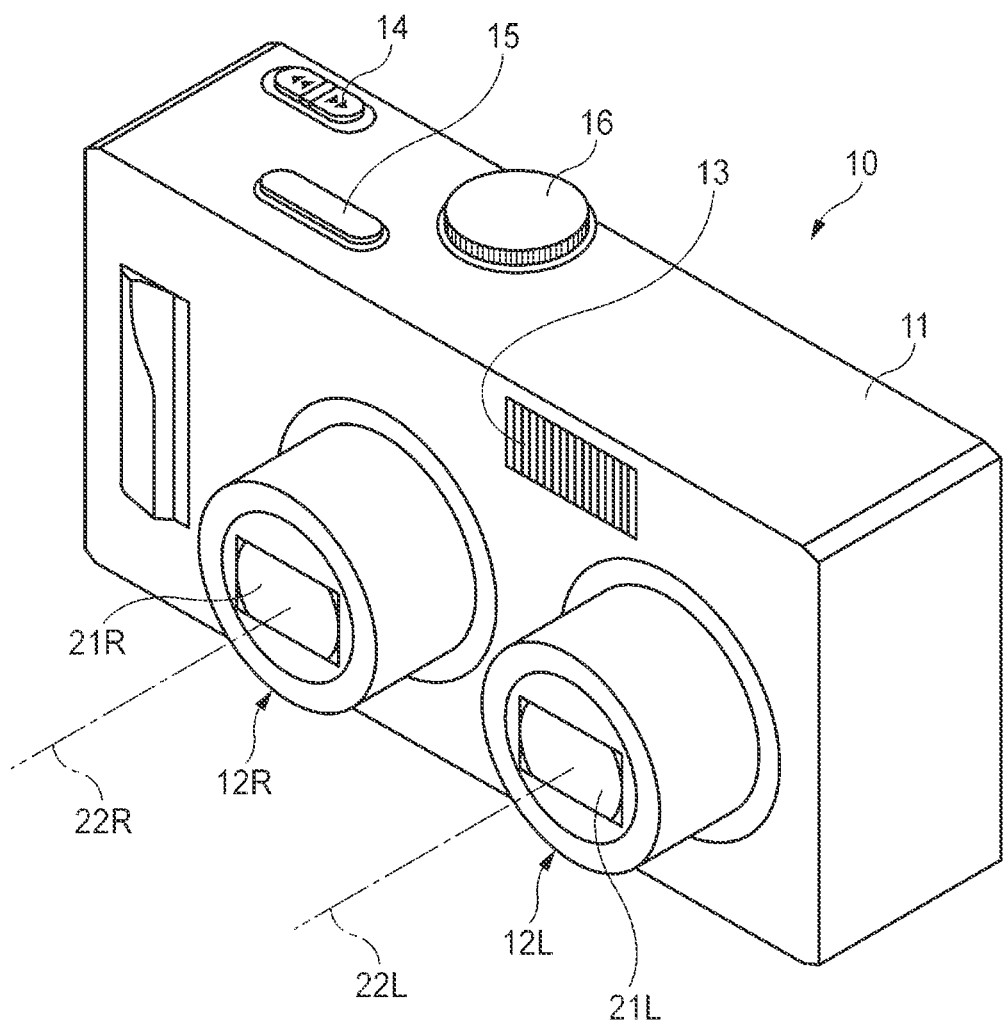
FIG. 1 is a perspective view of an exterior appearance of an image capturing apparatus (stereoscopic camera) according to an embodiment of the present invention.

FIG. 1 is a perspective view of an exterior appearance of a stereoscopic image capturing apparatus (a digital camera for a stereoscopic image of left and right eyes in the embodiment and hereinafter, referred to as a stereoscopic camera or simply referred to as a camera). The stereoscopic camera 10 includes a box shaped housing 11, an image capturing unit 12R for a right eye and an image capturing unit 12L for a left eye which are provided in parallel to each other in front of the housing 11, a flash light 13 which is provided at a front left shoulder of the housing 11, a power switch 14 which is provided at an appropriate location of an upper surface of the housing 11, a shutter button 15, and a mode selection dial 16.

Figure 2:
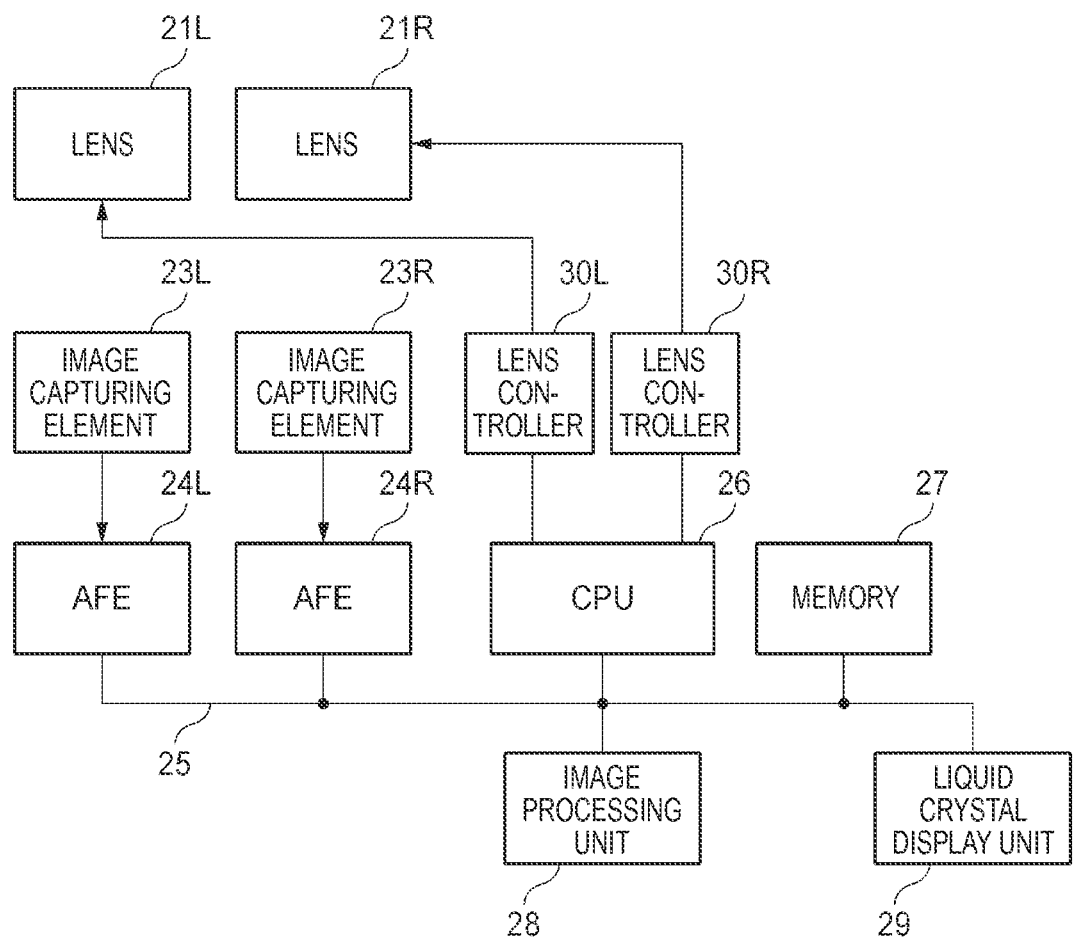
FIG. 2 is a functional block diagram of the stereoscopic camera illustrated in FIG. 1.

A liquid crystal display unit (monitor) 29 which is illustrated in FIG. 2 is provided on a rear surface of the housing 11 to display a through image, a mode selection screen, a menu screen, and a guide display. A lenticular lens sheet which is not illustrated is attached onto the liquid crystal display unit 29 so as to display a stereoscopic image.

The image capturing unit 12R includes a photographing lens 21R on a front side and the image capturing unit 12L includes a photographing lens 21L on a front side. An angle at which an optical axis 22R of the photographing lens 21R and an optical axis 22L of the photographing lens 21L intersect is referred to as an angle of convergence and an actuator (lens controllers 30L and 30R which will be described below) which controls directions of the image capturing units 12R and 12L so that the angle of convergence reaches a target value is embedded in the stereoscopic camera 10. Further, the stereoscopic effect of the stereoscopic image may be controlled by adjusting a left and right deviation of the left and right captured images using an image processing technology while fixing an angle of convergence between the photographing lenses 21R and 21L.

The photographing lenses 21R and 21L may independently adjust a focal position and a zooming magnification but in a stereo photography mode, the photographing lenses 21R and 21L are controlled to interwork with each other to photograph a stereoscopic image of the photographic subject.

FIG. 2 is an internal functional block diagram of the stereoscopic camera 10 illustrated in FIG. 1. A solid-state image capturing element 23L is disposed at a rear side of the photographing lens 21L and a solid-state image capturing element 23R is disposed at a rear side of the photographing lens 21R. Output signals of the solid-state image capturing elements 23L and 23R are connected to analogue front end (AFE) circuits 24L and 24R, respectively and outputs of the AFE circuits 24L and 24R are connected to a bus 25.

A CPU (system controller) 26, a memory 27, an image processing unit (DSP) 28, and a liquid crystal display unit 29 are connected to the bus 25. The image processing unit 28 receives a command from the CPU 26 to perform known image processings such as an offset processing, a gamma correction processing, a RGB/YC conversion processing, and a synchronization processing and records captured image data in an external memory such as a memory card which is not illustrated.

Lens controllers 30L and 30R are connected to the CPU 26 and the lens controller 30L controls a focal position and a zooming magnification of the photographing lens 21L in accordance with a command from the CPU 26 and the lens controller 30R controls a focal position and a zooming magnification of the photographing lens 21R in accordance with a command from the CPU 26 independently from the photographing lens 21L. When stereo photographing is performed, the lens controllers 30L and 30R interwork to control the photographing lenses 21L and 21R to have the same magnification and the same focal position in accordance with the commands from the CPU 26.

The CPU 26 has a photographic subject selecting function to select a specific photographic subject among photographic subjects. For example, a focused photographic subject, a photographic subject which is detected by object detection such as detection of a face or a photographic subject having a spatial frequency (edge) which is equal to or higher than a threshold value is selected as a specific photographic subject. Alternatively, if a touch panel is attached onto the liquid crystal display unit 29, the CPU 26 selects a photographic subject which is designated through touch manipulation by a user as a specific photographic subject.

Figure 3:
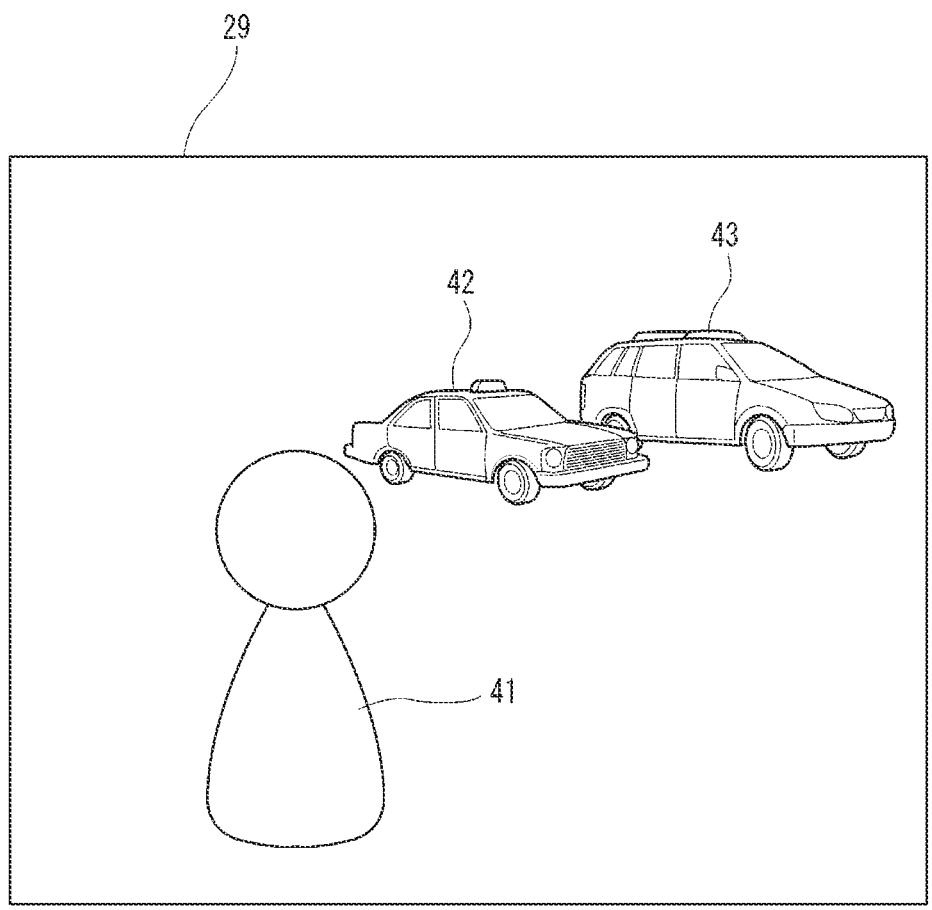
FIG. 3 is a view illustrating an example of a displayed image of a display unit which is provided on a rear surface of the stereoscopic camera of FIG. 1.

FIG. 3 is a view illustrating an example of a display screen of the liquid crystal display unit 29 which is provided on a rear surface of the camera. A character image 41 is focused and images 42 and 43 of two vehicles are seen at an opposite side.

Even when the user sees the stereoscopic image of FIG. 3 which is displayed as a through image, the user may not clearly recognize which image is focused in some cases. In this example, it is assumed that the image 42 of a vehicle is actually focused and the user wants to focus on the character image 41.

Figure 4:
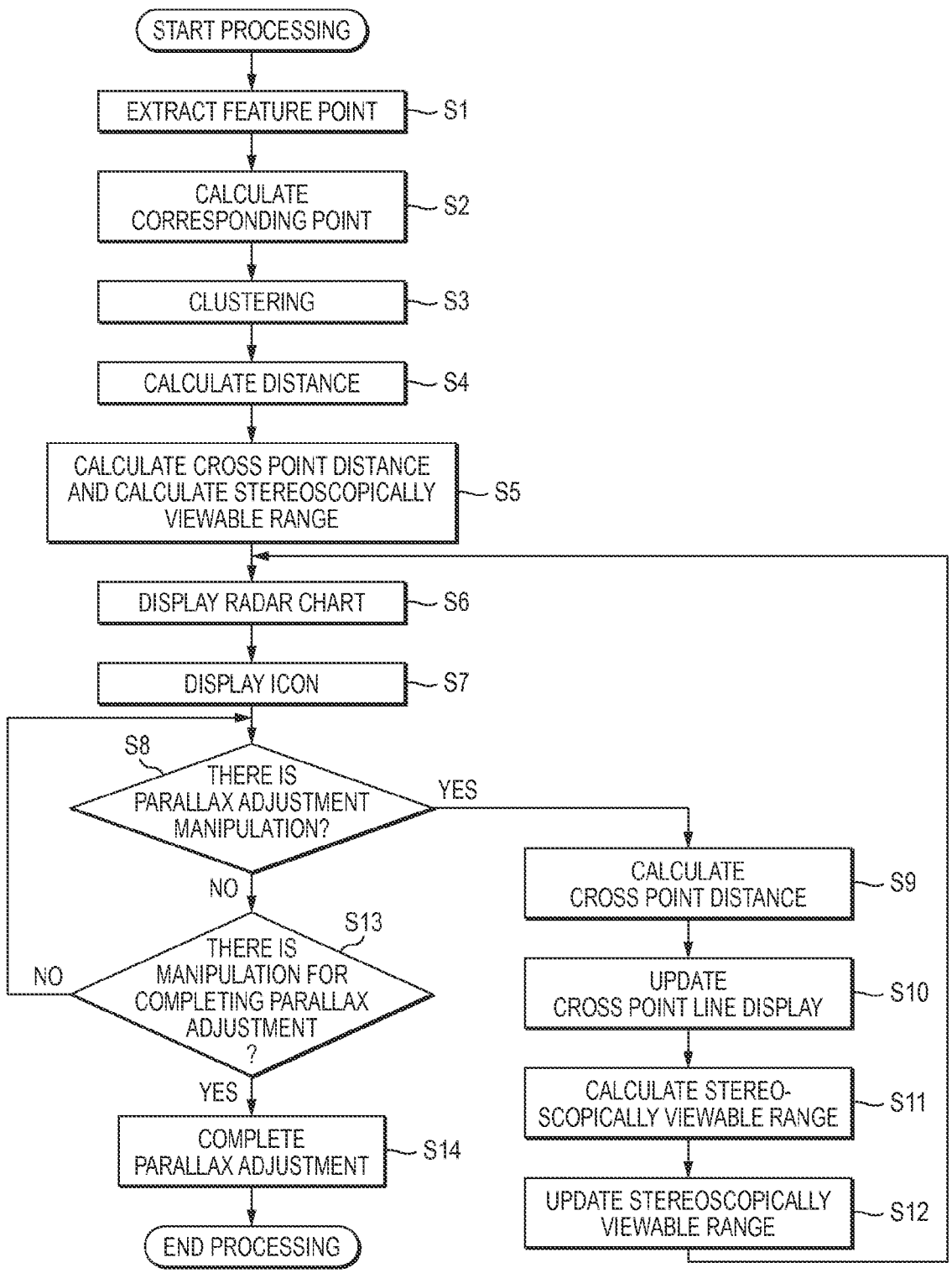
FIG. 4 is a flowchart illustrating a sequence of parallax adjustment process according to a first embodiment of the present invention.

FIG. 4 is a flowchart illustrating a sequence of parallax adjustment process which is executed by the CPU 26 of FIG. 2 when a user inputs an instruction. When the processing starts, first, in step S1, feature points of the images (a two-dimensional image for a left eye which is captured by the solid-state image capturing element 23L and a two-dimensional image for a right eye which is captured by the solid-state image capturing element 23R) are extracted.

In next step S2, a corresponding point between feature points of left and right images is calculated. In step S1, a feature point in the two-dimensional image for a left eye and a feature point in the two-dimensional image for a right eye are extracted. However, feature point extracting algorithms for both images are the same so that the same feature points may be extracted from both images. That is, the correspondence between the same feature points in both images is calculated in step S2. A distance between corresponding feature points becomes a parallax amount.

In next step S3, clustering is performed. That is, clustering is performed on the feature points which are extracted in step S1 and then associated with each other in step S2. Referring to FIG. 3, a set of feature points which belong to the image 41 and a set of feature points which belong to the image 42, and a set of feature points which belong to the image 43 are clustered and then the feature points are managed for every photographic subject image.

In next step S4, a distance from the camera to each of the feature points (a group of feature points) is calculated and in step S5, a distance (hereinafter, referred to as a cross point) where a parallax is zero is calculated from the distance from the camera 10 and a stereoscopically viewable range is calculated.

In next step S6, the CPU 26 displays a pseudo overhead view (hereinafter, also referred to as a radar chart, which will be described with reference to FIG. 5) of the captured photographic subject (scene) which is seen from an upper side with respect to the optical axis as a fan-shaped area on the liquid crystal display unit 29. In this case, for example, an image of a specific photographic subject in the displayed image, for example, a circle frame, a rectangle frame, and a triangle frame are displayed so as to overlap the specific photographic subjects and icons (or may be distinguished by colors) of the circle frame, the rectangle frame, and the triangle frame may be displayed in the radar chart instead of the images of the photographic subjects (step S7). As described above, the CPU 26 serves as a display controller which displays the radar chart 50 obtained when the photographic subject is seen from the upper side with respect to the optical axis in photographing the stereoscopic image in a partial display region of the liquid crystal display unit 29.

Figure 5:
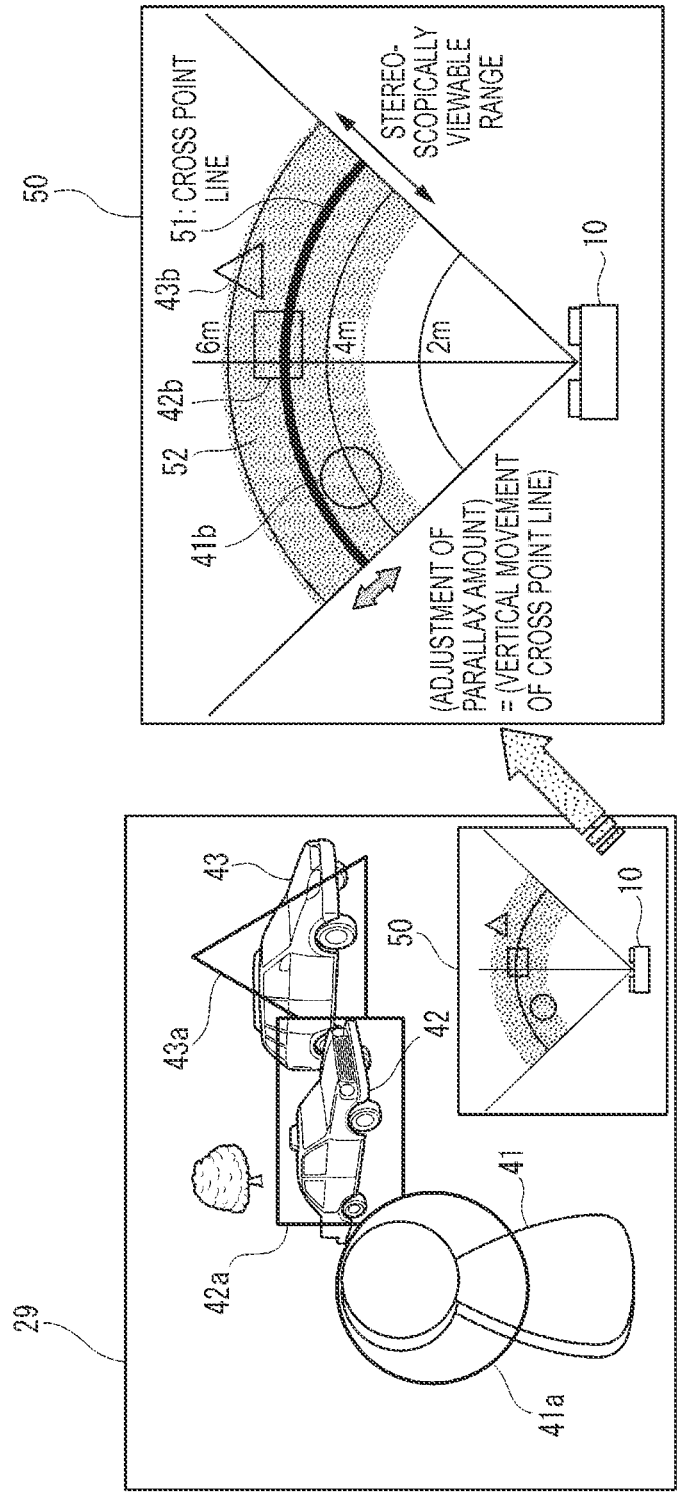
FIG. 5 is an explanatory view of a pseudo overhead view (radar chart) according to the first embodiment of the present invention.

A left drawing of FIG. 5 illustrates that the circle frame 41a, the rectangle frame 42a, and the triangle frame 43a are displayed so as to overlap the specific photographic subject images 41, 42, and 43 among the photographic subject images of FIG. 3. The two-dimensional image for a left eye and the two-dimensional image for a right eye are displayed so as to overlap each other. Actually, the two dimensional image for a left eye and the two dimensional image for a right eye are alternately displayed for every frame and then enter eyes of a person who watches a display screen through a lenticular lens sheet so that the images are recognized as a stereoscopic image. Further, an empty space of the screen, for example, a small window in a right lower area is open and then the radar chart 50 is displayed in the window.

The right drawing of FIG. 5 is an enlarged view of the radar chart 50. In the drawing, an arc-shaped thick line 51 indicates a line indicating that the parallax amount is zero. The line 51 indicating that the parallax is zero will be referred to as a cross point line hereinafter.

At the cross point at which the parallax amount is zero, the two dimensional image for a left eye and the two dimensional image for a right eye do not have parallax and match each other. In an example illustrated in the drawing, the image 42 is focused so that there is no deviation between a feature point on the two dimensional image for a left eye and a feature point on the two dimensional image for a right eye of the image 42 and the feature points match. Therefore, an icon 42*b* (the rectangle frame in this example) indicating the image 42 is on the cross point line 51 on the radar chart 50.

To the contrary, an icon 41*b* (the circle frame) indicating the image 41 is prior to the cross point line 51 and an icon 43*b* (the triangle frame) indicating the image 43 is on the opposite side to the cross point line 51 on the radar chart 50. A shaded arc-shaped region 52 in the drawing indicates a stereoscopically viewable range. Further, an approximate distance which is calculated by the camera is represented on a center line.

Referring back to FIG. 4, in step S8 next to step S7, it is determined whether a parallax adjustment manipulation is performed. The parallax adjustment is, for example, performed by manipulation (for example, parallax adjustment is designated to perform parallax adjustment using an arrow key for manipulation) which keeps the left image and the right image to be close to each other or away from each other.

When the parallax adjustment manipulation is performed, the sequence proceeds from step S8 to step S9 and a distance from the camera 10 to the cross point after parallax adjustment manipulation is recalculated. In next step S10, it is instructed to update the display of the cross point line 51.

Figure 6:
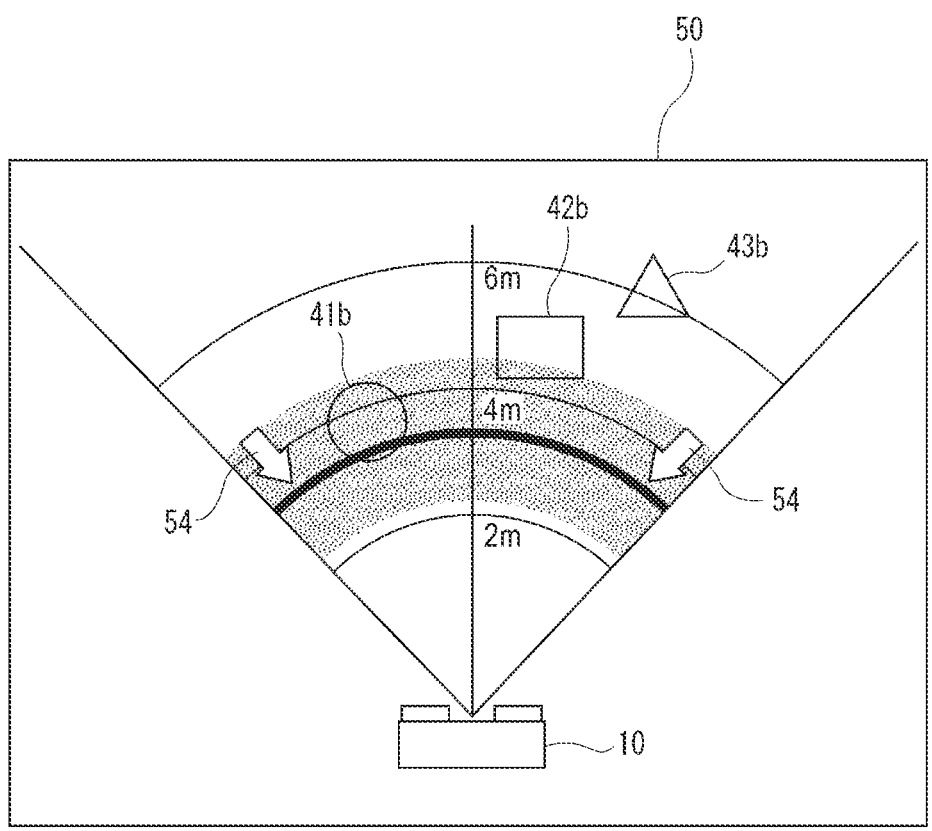
FIG. 6 is an enlarged explanatory view of the radar chart illustrated in FIG. 5.

Together with the instruction of updating the cross point line 51, the stereoscopically viewable range 52 is recalculated (step S11) to instruct to update the display of the stereoscopically viewable range (step S12), and the sequence returns to step S6 to re-display an updated radar chart 50. An enlarged view of the redisplayed radar chart 50 is illustrated in FIG. 6. The cross point line moves (an arrow 54) so as to be aligned with the position of the icon 41*b* of the character image.

As described above, according to the embodiment, the parallax is adjusted so that a distance from the camera in which the parallax amount is zero is changed so that the displayed position of the cross point line 51 on the radar chart 50 is correspondingly moved. If the user wants to focus on the character image 41, the parallax may be adjusted such that the cross point line 51 is positioned to overlap the icon 41 corresponding to the character image 41 on the radar chart 50.

As a result of determination of step S8, if there is no parallax adjustment manipulation, the sequence proceeds from step S8 to step S13 to determine whether there is manipulation for completing the parallax adjustment. If there is no completing manipulation, the sequence returns to step S8 and if there is completing manipulation, the parallax adjustment is completed (step S14) and the processing ends.

Figure 7:
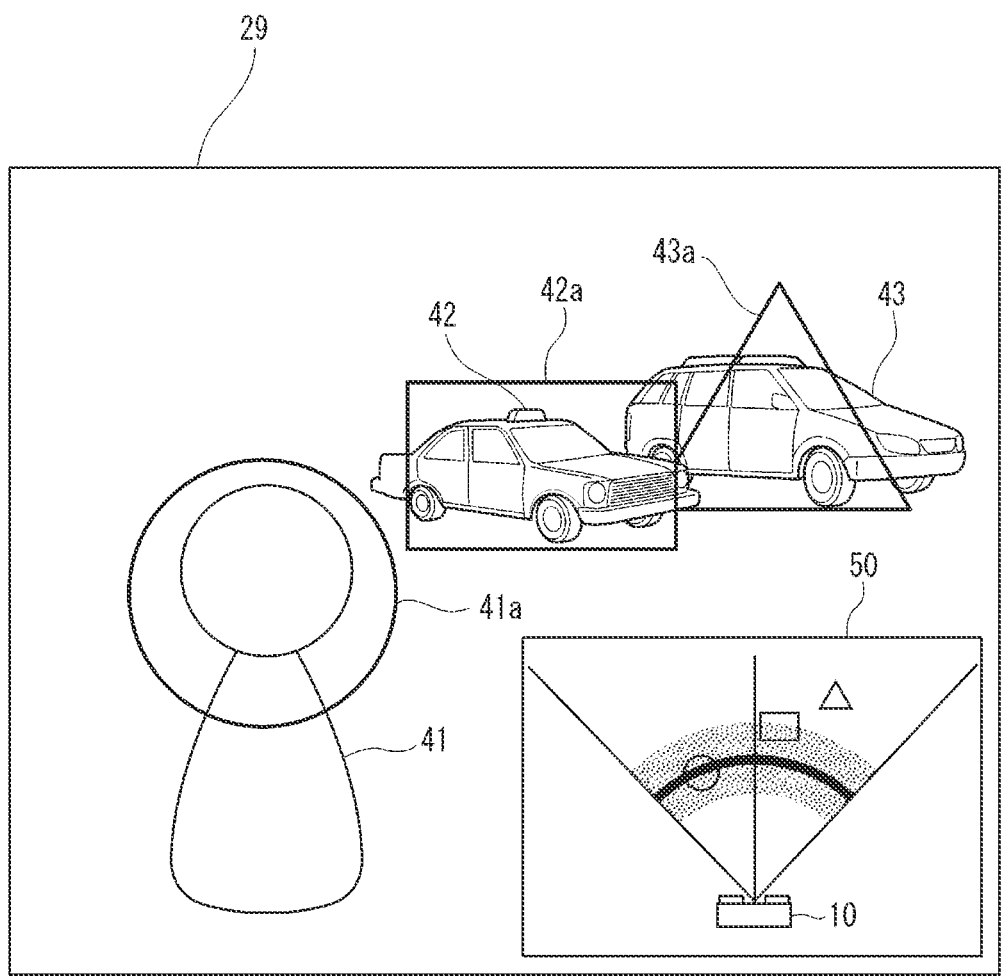
FIG. 7 is a view illustrating an example of a displayed image of a display unit after adjusting a parallax from a status of a left drawing of FIG. 5.

FIG. 7 is a view illustrating a displaying example of a screen after completing the parallax adjustment. In the left drawing of FIG. 5, the right image and the left image of the character image 41 are shifted from each other but in FIG. 7, the parallax is zero in the character image 41 so that the character image 41 in the two-dimensional image for a left eye and the character image 41 in the two-dimensional image for a right eye match.

As described above, according to the embodiment, by displaying the radar chart 50, the distance from the camera to each of the photographic subjects may be visibly recognized and the anteroposterior relationship between the cross point and the photographic subject is visibly recognized so that a photographic subject which is displayed so as to protrude from the screen or a photographic subject which is displayed so as to be recessed may be precisely and visibly recognized. Further, by displaying the stereoscopically viewable region 52, adjustment is performed while checking a relative relationship of a plurality of photographic subjects.

Further, in the above-described embodiment, even though icons are displayed for every specific photographic subject, the feature point may be displayed on the radar chart using any of figures or an object (a shape of a person or a shape of a building or a car) corresponding to the photographic subject image may be displayed on the radar chart.

Figure 8:
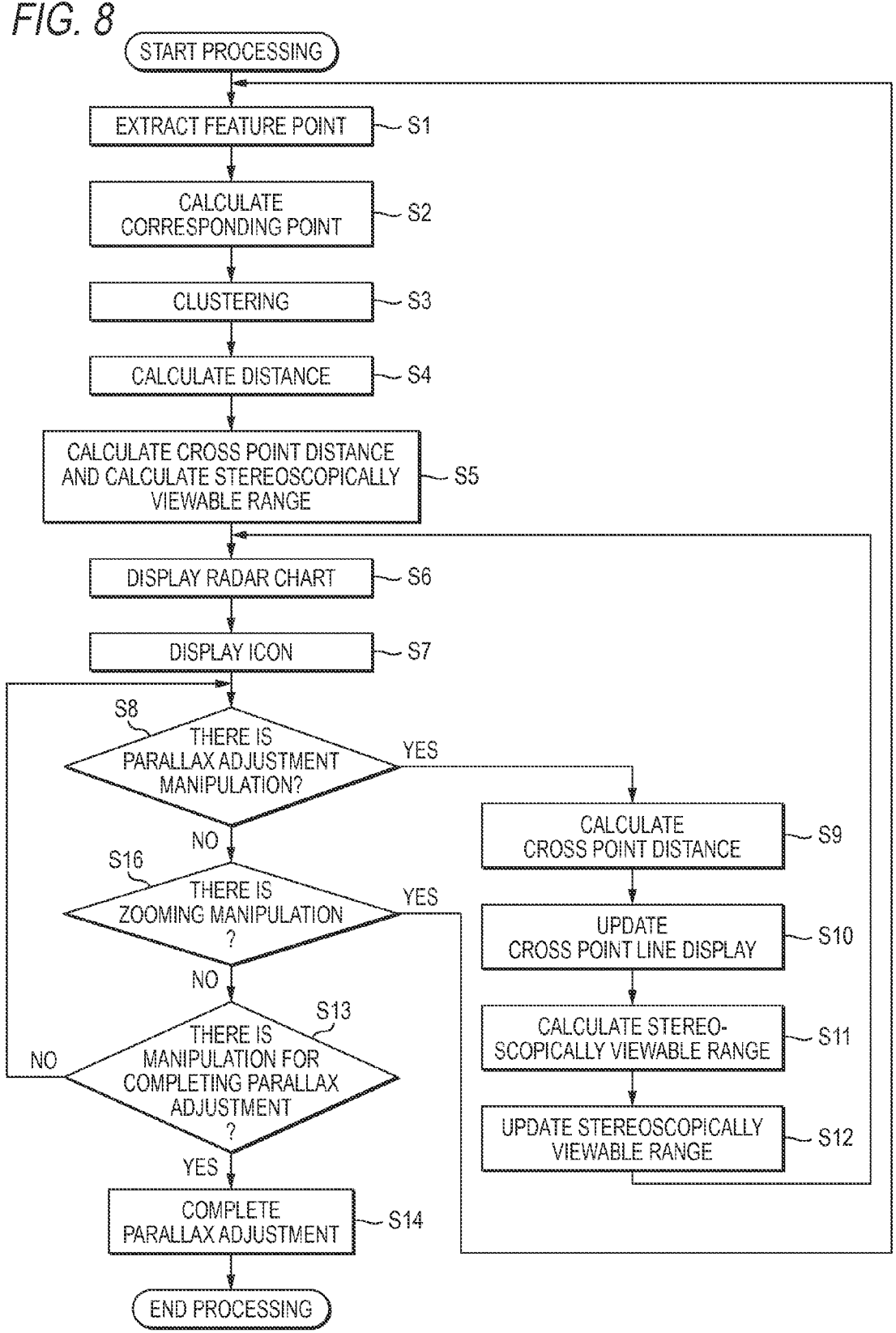
FIG. 8 is a flowchart illustrating a sequence of parallax adjustment process according to a second embodiment of the present invention.
Figure 9:
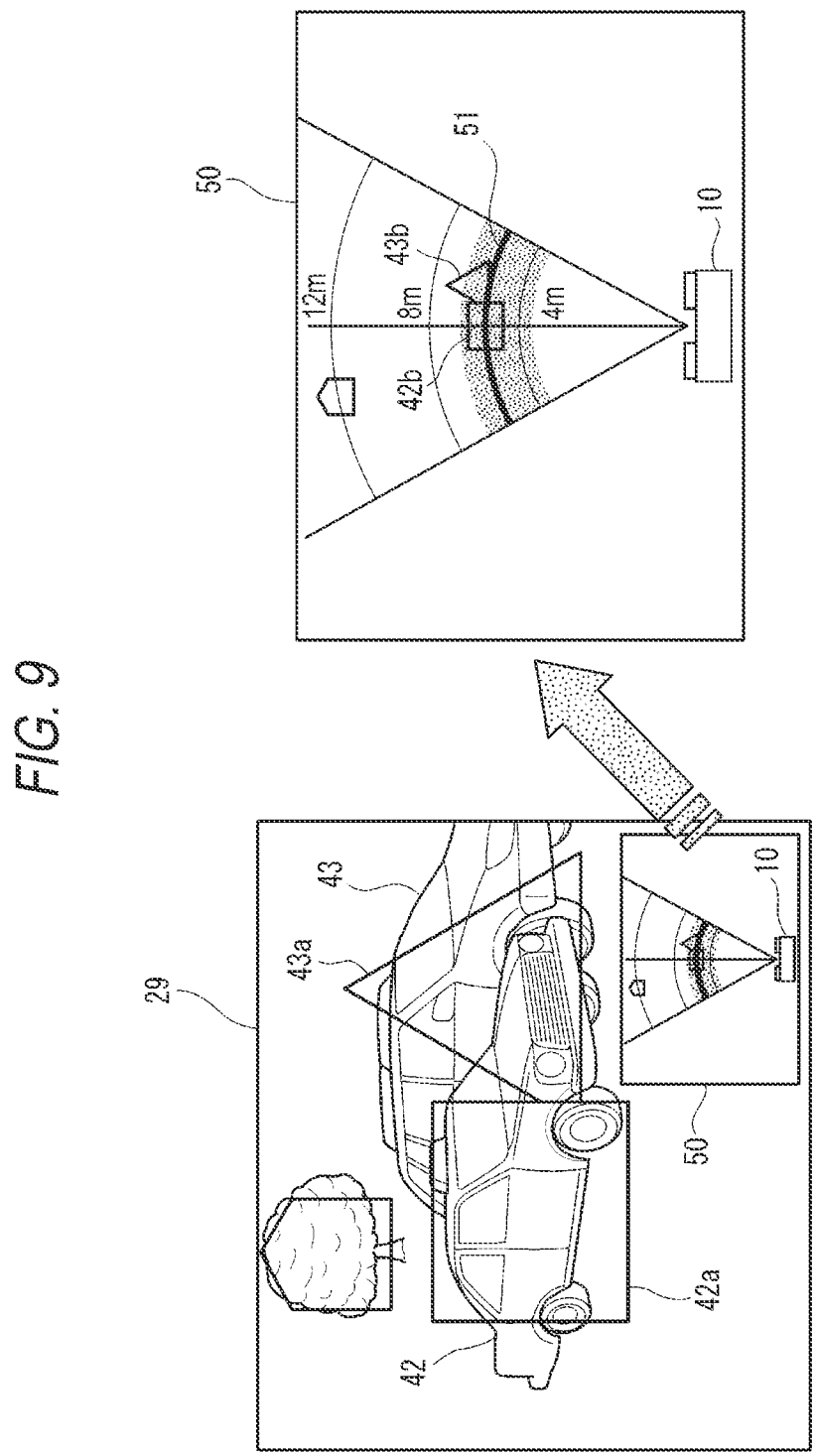
FIG. 9 is an explanatory view illustrating a parallax adjustment processing according to the second embodiment of the present invention.

FIG. 8 is a flowchart illustrating a sequence of parallax adjustment process according to another embodiment of the present invention. When the photographing lens which is mounted in the camera 10 has a function of a telescopic (zoom) lens, if the zooming manipulation is performed, as illustrated in FIG. 9, a stereoscopically viewable region is changed so that a photographic subject in the distance may be stereoscopically viewed. Therefore, in the embodiment, a processing to determine whether an angle of view is changed by the zooming manipulation is provided.

The embodiment of FIG. 8 is different from the embodiment of FIG. 4 in that step 16 of determining "whether there is zooming manipulation" is added between step S8 and step S13 of the flowchart of FIG. 4 and other processing steps are the same as FIG. 4. Therefore, the same processing steps are denoted by the same step numbers and the description thereof will be omitted.

In the embodiment, if it is determined that there is no parallax adjustment manipulation in the processing of determining whether there is parallax adjustment manipulation in step S8, in next step S16, it is determined whether there is zooming manipulation. If there is no zooming manipulation, the sequence proceeds to step S13 to determine whether there is completing manipulation.

As a result of the determination processing of step S16, if it is determined that there is the zooming manipulation, the sequence returns to step S1 to perform the sequence of parallax adjustment process from the start again. As a result, as illustrated in FIG. 9, the radar chart 50 in accordance with the zoomed amount is displayed and thus the user may adjust the parallax in accordance with the zoomed amount.

Figure 10:
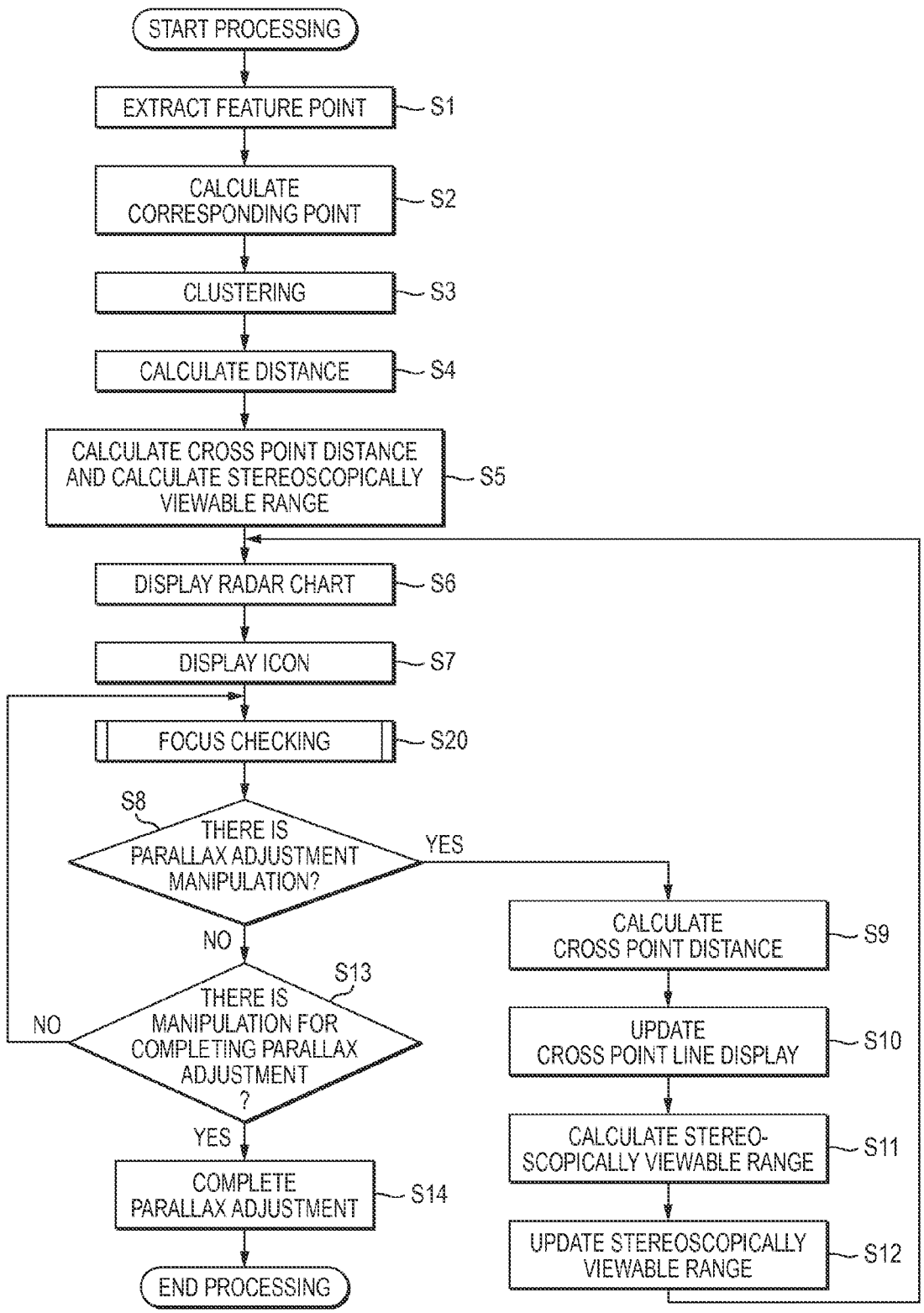
FIG. 10 is a flowchart illustrating a sequence of parallax adjustment process according to a third embodiment of the present invention.

FIG. 10 is a flowchart illustrating a sequence of parallax adjustment process according to yet another embodiment of the present invention. Some digital cameras have a function that when a user checks whether a displayed image is focused while viewing the displayed image on a rear side of the camera, as disclosed in Japanese Patent Application Laid-Open No. 2006-222979, enlarges a portion of the image to be focused to allow the user to perform focusing again.

The embodiment of FIG. 10 is applied to the digital camera which has a focus checking function described above. The processing sequence of FIG. 10 is almost the same as the processing sequence of FIG. 4 and there is only the difference in that a focus checking step S20 is provided between the processing step S7 and the processing step S8 of FIG. 4 and the other processing steps are the same as FIG. 4. Therefore, the same steps are denoted by the same step numbers and the description thereof will be omitted.

The captured image is displayed on the liquid crystal display unit 29 on the rear surface of the camera, the radar chart 50 is displayed in step S6, and an icon corresponding to an image of a specific photographic subject is displayed in step S7, and then the sequence proceeds to a focus checking step S20.

Figure 11:
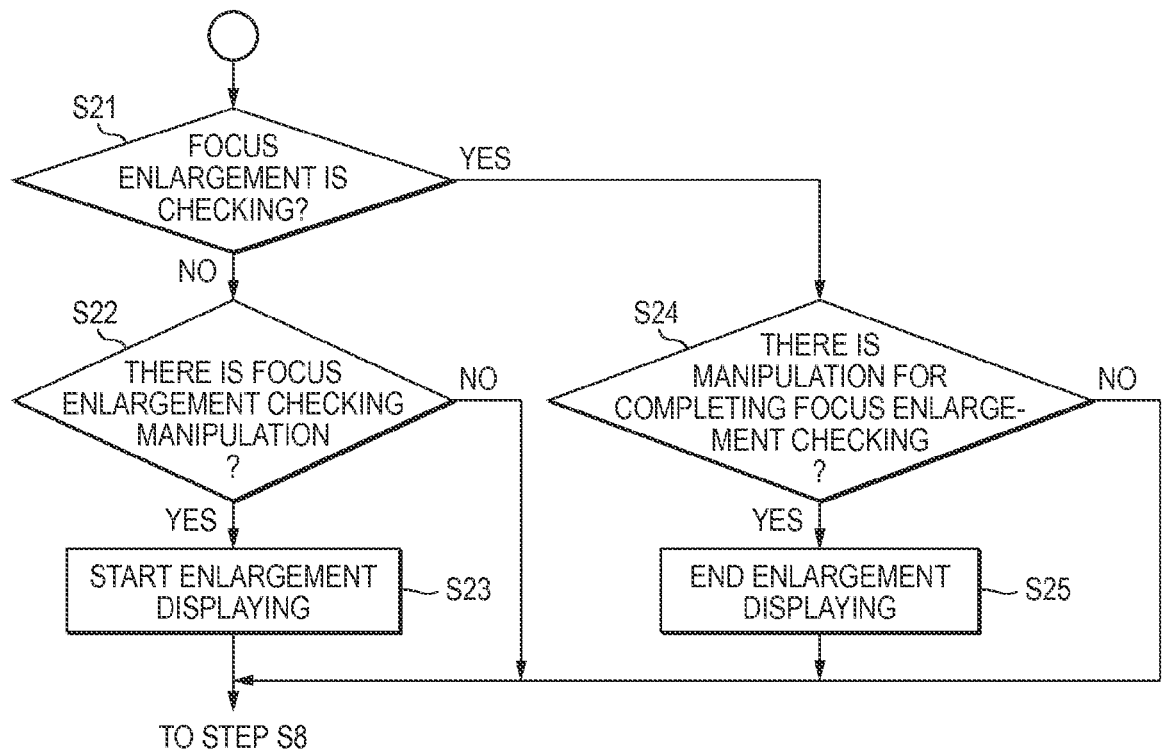
FIG. 11 is a flowchart illustrating a detailed sequence of main steps of FIG. 10.

In step S20, as illustrated in FIG. 11, first, a focus region is enlarged in step S21 to determine whether the user is checking the focus. When the focus region is not enlarged (No in the determination result of step S21), the sequence proceeds to step S22 to determine whether there is manipulation for instructing to enlarge and check the focus region. If the determination result is affirmative, displaying of the focus region to be enlarged starts in step S23 and then the sequence proceeds to step S8 of FIG. 10.

Figure 12:
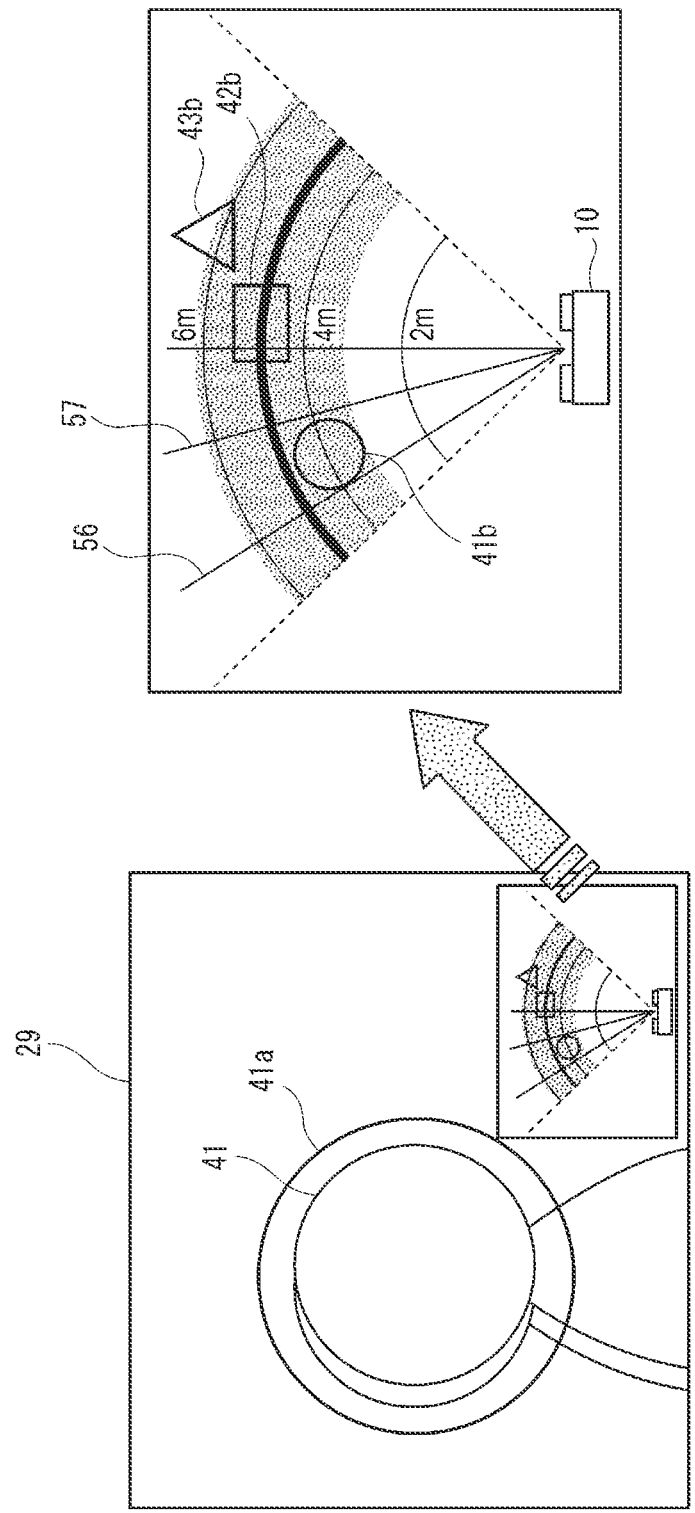
FIG. 12 is an explanatory view illustrating a parallax adjustment processing according to a third embodiment of the present invention.

The left drawing of FIG. 12 is a view illustrating an enlarged focus region. In this example, the character image 41 is displayed to be enlarged so that the user may see the enlarged view of the image 41 to check whether the image is focused. In this case, as illustrated in the right drawing of FIG. 12, lines 56 and 57 representing a range enlarged in the left drawing may be distinguished from the others, for example, by a red line on the radar chart 50. By doing this, the user may check the angle of view which is enlarged and displayed on the radar chart 50.

As a result of determination of step S21, when the focus region is enlarged to be checked (affirmative determination result), the sequence proceeds to step S24 and then it is determined whether there is manipulation for completing the enlarging and checking of the focus region. When the determination result is affirmative, the sequence proceeds to step S25 to complete the enlarging and displaying and the sequence proceeds to step S8. Even when the determination results of steps S22 and S24 are negative, the sequence proceeds to step S8.

In the above-described embodiment, in a binocular stereoscopic image capturing apparatus, the optical axes 22L and 22R of the photographing lenses 21L and 21R are fixed and the captured images are moved in a horizontal direction to control a pixel number to adjust the parallax amount to provide an stereoscopic effect but the embodiment may be configured to adjust the directions of the optical axes 22L and 22R of the photographing lenses to control an angle of convergence. Further, the stereoscopic effect is changed by changing an amount of movement of the two captured images in the horizontal direction in the image processing, which may be applied not only to the through image but also to a case when a position of the completely photographed stereoscopic image where the parallax amount is zero is changed.

Even though the embodiments of FIGS. 8 and 10 are separately described, it is obvious that both embodiments may be performed together.

An image display apparatus in the embodiments described above, includes: a stereoscopic image obtaining unit which obtains a plurality of images having different points of view; a display unit which displays the plurality of images obtained by the stereoscopic image obtaining unit; a photographic subject selecting unit which selects a specific photographic subject in any one of the plurality of images; and a display controller which displays a line where a parallax amount of a first viewpoint image and a second viewpoint image among the plurality of images is zero and an anteroposterior relationship of the line where the parallax amount is zero and a position of the specific photographic subject in an optical axis direction in photographing a stereoscopic image in a partial display region of the display unit as a pseudo overhead view of the photographic subject which is seen from an upper side with respect to the optical axis in photographing the stereoscopic image.

The image display apparatus in the embodiments may have a configuration, in which the display controller displays a position of an image of the specific photographic subject as an icon on the pseudo overhead view.

The image display apparatus in the embodiments may have a configuration, in which the display controller displays a stereoscopically viewable region before and after the line where the parallax amount is zero in the pseudo overhead view.

The image display apparatus in the embodiments may have a configuration, in which when the line where the parallax amount is zero is changed by adjusting the parallax of the first viewpoint image and the second viewpoint image, the display controller updates the displaying of the pseudo overhead view.

The image display apparatus in the embodiments may have a configuration, in which when manipulation for checking an enlarged image in a focus region in which any one of the photographic subjects is focused is performed, the display controller updates the displaying of the pseudo overhead view in accordance with the enlarged image.

The image display apparatus in the embodiments may have a configuration, in which the display controller displays a distance on the pseudo overhead view.

A parallax adjustment display method of an image display apparatus in the embodiments, which includes a stereoscopic image obtaining unit which obtains a plurality of images having different points of view; a display unit which displays the plurality of images obtained by the stereoscopic image obtaining unit; and a photographic subject selecting unit which selects a specific photographic subject in any one of the plurality of images, the method includes: displaying a line where a parallax amount of a first viewpoint image and a second viewpoint image among the plurality of images is zero and an anteroposterior relationship of the line where the parallax amount is zero and a position of the specific photographic subject in an optical axis direction in photographing a stereoscopic image in a partial display region of the display unit as a pseudo overhead view of the photographic subject which is seen from an upper side with respect to the optical axis in photographing the stereoscopic image.

An image capturing apparatus in the embodiments, includes: a zoom lens, in which when zooming manipulation of the zoom lens is detected, the display controller updates the displaying of the pseudo overhead view in accordance with a zoomed amount of the zoom lens.

According to the above-described embodiments, a pseudo overhead view (radar chart) is displayed to change the position where the parallax amount is zero by adjusting the parallax so that the influence when the parallax is adjusted is easily recognized. Therefore, it is easy to adjust the parallax.

According to the parallax adjustment display method according to the present invention, it is intuitively understood how the adjustment of the parallax affects the stereoscopic effect of the stereoscopic image, so that the parallax adjustment display method may be usefully applied to an image capturing apparatus such as a stereo camera or an image display apparatus which is installed in the image capturing apparatus, or an image display apparatus which receives stereoscopic image data in a personal computer to process the stereoscopic image data. Information indicating the stereoscopic image data may be obtained from header information of the image data by the image display apparatus so that the same processing as in the above-described stereoscopic image capturing apparatus is possible.

Although the present invention has been described in detail with reference to specific embodiments thereof, it is obvious to those skilled in the art that various changes or modifications may be made without departing from the spirit and scope of the present invention.

This application is based on Japanese Patent Application No. 2011-218535 filed on Sep. 30, 2011 and the entire contents of which are incorporated herein by reference.

What is claimed is:

1. An image display apparatus, comprising:
   a processor that performs the functions of a stereoscopic image obtaining unit and a photographic subject selecting unit;
   said stereoscopic image obtaining unit which obtains a plurality of images having different points of view;
   a display unit which displays the plurality of images obtained by the stereoscopic image obtaining unit;
   said photographic subject selecting unit which selects a specific photographic subject in any one of the plurality of images; and
   a display controller which displays a line where a parallax amount of a first viewpoint image and a second viewpoint image among the plurality of images is zero and an anteroposterior relationship of the line where the parallax amount is zero and a position of the specific photographic subject in an optical axis direction in photographing a stereoscopic image in a partial display region of the display unit as a pseudo overhead view of the photographic subject which is seen from an upper side with respect to the optical axis in photographing the stereoscopic image,
   wherein the display controller displays a stereoscopically viewable region before and after the line where the parallax amount is zero in the pseudo overhead view.

2. The image display apparatus of claim 1, wherein the display controller displays a position of an image of the specific photographic subject as an icon on the pseudo overhead view.

3. The image display apparatus of claim 1, wherein when the line where the parallax amount is zero is changed by adjusting the parallax of the first viewpoint image and the second viewpoint image, the display controller updates the displaying of the pseudo overhead view.

4. The image display apparatus of claim 1, wherein when manipulation for checking an enlarged image in a focus region in which any one of the photographic subjects is focused is performed, the display controller updates the displaying of the pseudo overhead view in accordance with the enlarged image.

5. The image display apparatus of claim 1, wherein the display controller displays a distance on the pseudo overhead view.

6. An image capturing apparatus, comprising the image display apparatus of claim 1.

7. The image capturing apparatus of claim 6, comprising:
   a zoom lens,
   wherein when zooming manipulation of the zoom lens is detected, the display controller updates the displaying of the pseudo overhead view in accordance with a zoomed amount of the zoom lens.

* * * * *